United States Patent [19]
Okamuro

[11] Patent Number: 4,515,376
[45] Date of Patent: May 7, 1985

[54] SEAL INSTALLATION DEVICE WITH COAXIAL HANDLE PARTS

[75] Inventor: James A. Okamuro, Kalamazoo, Mich.

[73] Assignee: Borroughs Tool & Equipment Corporation, Kalamazoo, Mich.

[21] Appl. No.: 639,643

[22] Filed: Aug. 8, 1984

[51] Int. Cl.³ .................... F16J 15/00; B23P 19/02
[52] U.S. Cl. .................... 277/9.5; 277/10; 277/11; 29/235; 29/450; 29/451
[58] Field of Search .................... 277/1, 9, 9.5, 10, 11; 29/235, 450, 451, 464

[56] References Cited

U.S. PATENT DOCUMENTS

| | | | |
|---|---|---|---|
| 2,261,465 | 11/1941 | Grange et al. | 29/450 X |
| 2,379,508 | 7/1945 | Dodge | 29/451 X |
| 2,877,543 | 3/1959 | Myers | 29/235 |
| 2,968,864 | 1/1961 | Lee | 29/235 |
| 3,073,016 | 1/1963 | Drake | 29/450 X |
| 3,393,439 | 7/1968 | Shriver | 29/450 X |
| 4,392,293 | 7/1983 | Yamaguchi et al. | 29/451 X |
| 4,470,185 | 9/1984 | Weber | 29/235 |

FOREIGN PATENT DOCUMENTS

| | | | |
|---|---|---|---|
| 1101723 | 4/1955 | France | 277/11 |
| 904974 | 2/1982 | U.S.S.R. | 29/235 |

*Primary Examiner*—Robert S. Ward
*Attorney, Agent, or Firm*—Flynn, Thiel, Boutell & Tanis

[57] ABSTRACT

A cup seal installation device which has first and second handle parts each having an axially extending hole therethrough. Structure is provided for coupling the two handle parts together and for limiting the amount of reciprocal movement therebetween to first and second limits. A first outside diameter portion on the second part terminates in a first shoulder and a second outside diameter portion larger than the first outside diameter portion. An elongate guide member having a stem at one end thereof is removably received into the hole provided in the second handle part. The outer surface of the guide member and the outer surface of the first outside diameter portion on the second part are generally equal in diameter so that a smooth and unobstructed transition surface exists between the two surfaces. The end of the guide member remote from the stem has a guide surface thereon converging in a direction away from the stem so that the cup seal can be guided onto the guide surface with the initial converging wall of the lip on the seal being conformed to the converging wall of the guide surface. The seal can thereafter be slid along the length of the guide member to a position snugly encircling the first outside diameter portion to thereby ready the cup seal for installation.

4 Claims, 9 Drawing Figures

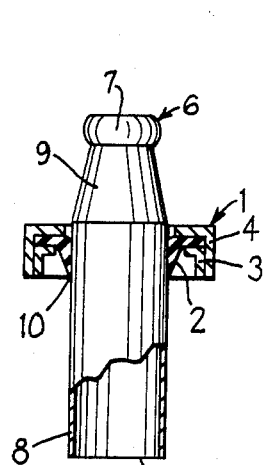
FIG. 1
PRIOR ART
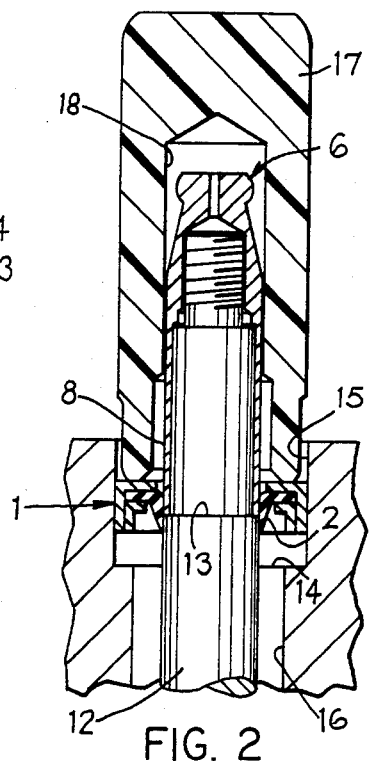
FIG. 2
PRIOR ART
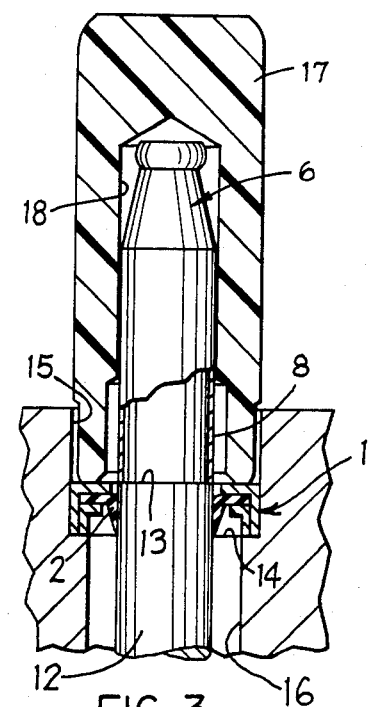
FIG. 3
PRIOR ART
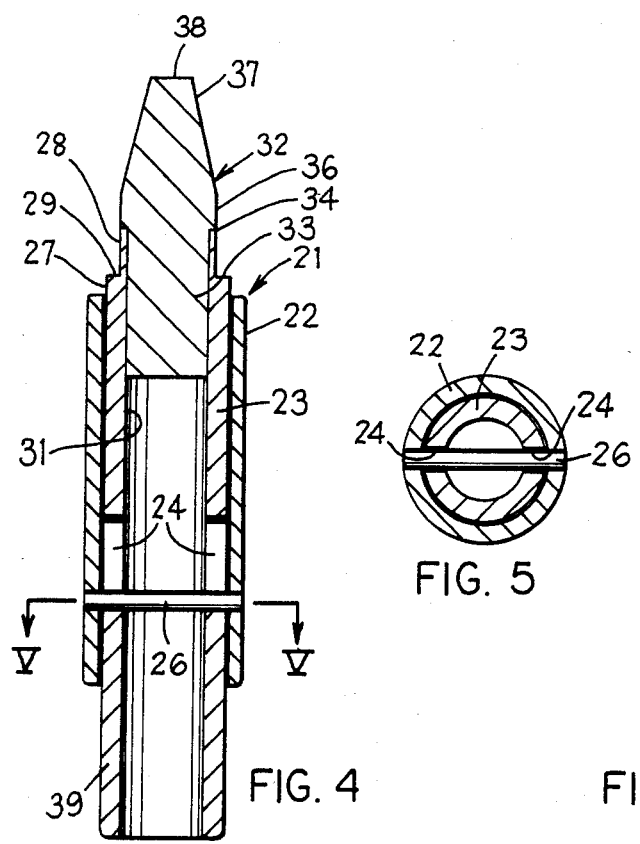
FIG. 4
FIG. 5
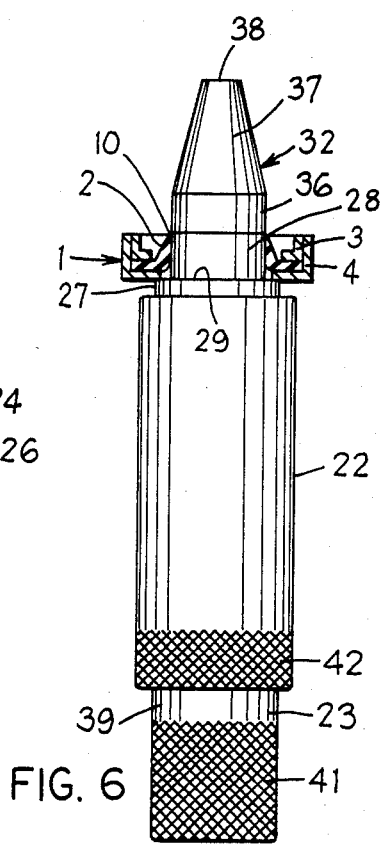
FIG. 6

SEAL INSTALLATION DEVICE WITH COAXIAL HANDLE PARTS

FIELD OF THE INVENTION

This invention relates to a seal installation device and, more particularly, to a device for enabling the installation of a sliding contact packing for use in association with rotatable shafts.

BACKGROUND OF THE INVENTION

Sliding contact packings of various kinds are known and have been known for many years. One such sliding contact packing is a cup seal 1 shown in FIG. 1. The cup seal includes an innermost lip 2, the inner diameter of the opening defined by the lip being variable due to the compressibility of the resilient material of the lip 2. The lip 2, as well as the entirety of the resilient seal member, can be made of leather or rubber composition with the radially outermost segment thereof being compressed between a pair of forced fit, telescoping cup-shaped metal casing members 3 and 4.

In order to install the seal 1 onto a shaft, great care has to be taken to prevent the lip 2 from tucking under or somehow becoming positioned on the shaft so that a portion of the seal 2 will permit the escape of fluid therepast. FIGS. 1 to 3 illustrate one type of device that has heretofore been used for purposes of installing the seal 1 onto a rotary shaft. The prior art device includes a guide member 6 having an end portion 7 that is smaller in diameter than the diameter of the hole formed by the lip portion 2 of the seal. The end 8 of the guide member 6 remote from the small diameter end 7 is of a size equal to the shaft diameter over which the seal 1 is to be placed. A conical segment 9 interconnects the end 8 with the small end 7.

In use, the seal 1 is placed so that the opening defined by the lip 2 receives therethrough the small end 7 of the guide member 6. The seal 1 is carefully slid along the length of the guide member first causing the lip 2 to slide onto the conical segment 9 and then causing the lip 2 to slide along the length of the cylindrical end segment 8 until the endmost portion 10 of the lip 2 is spaced a sufficient distance from the end wall 11 of the guide member 6. Extreme care must be exercised by the user to make sure that the lip 2 does not become tucked under or otherwise deformed during the aforesaid process so as to prevent the formation of a proper seal.

As is illustrated in FIG. 2, the guide member 6 has a hollow interior to enable the receipt therein of a shaft 12 around which the seal 1 is to be installed. The cylindrical end segment 8 of the guide member 6 is generally equal in its outer diameter to the outer diameter of the shaft 12. Thus, once the seal is oriented in its proper location on the guide member 6, the seal and the guide member 6 are both placed over the end of the shaft 12 until the end wall 11 of the guide member 6 abuts against a shoulder 13 on the shaft 12. It is common practice to provide a shoulder 13 an incremental distance from the bottom 14 of a counterbore 15 in an opening 16 through which the shaft 12 extends. The seal 1 is to, following assembly, occupy the space between the shoulder 13 and the bottom 14 of the counterbore.

Following a placement of the guide member 6 and associated seal 1 over the end of the shaft 12, a handle part 17 having an opening 18 therein is positioned so that the guide member 6 is received into the opening 18 in the position illustrated in FIG. 2. The user thereafter applies an axial force to the handle part 17 urging the seal member 1 into an encircling relation to the shaft 12 as illustrated in FIG. 3 and forced fit into the counterbore 15. It is preferred that the cylindrical wall 8 of the guide member 6 be approximately equal to or slightly less than the inner diameter of the opening 18 in the handle part 17 so that an appropriate guiding relation exists between the guide member 6 and the handle part 17.

The aforedescribed apparatus has fulfilled a basic need for facilitating the installation of cup seals onto shafts to form a shaft packing. However, in an effort to minimize the amount of time that it takes to install the cup seal, users of the apparatus oftentimes do not exercise the required amount of care to prevent the lip 2 of the seal 1 from tucking under or otherwise deforming to thereby prevent the formation of a positive seal between the lip 2 and the peripheral surface of the shaft 12. Accordingly, it is desirable to provide a device which will enable the quick installation of a cup seal onto a shaft.

Accordingly, it is an object of this invention to provide a seal installation device facilitating the quick installation of a cup seal onto a shaft to form a sliding contact packing.

It is a further object of the invention to provide a seal installation device, as aforesaid, which is simple and inexpensive in its construction, is made of durable components to thereby enable its use in the field without attention to maintenance and the like.

It is a further object of the invention to provide a seal installation device, as aforesaid, wherein a minimum of instruction will be required to enable the user thereof to quickly assemble a cup seal into an encircling and sealing relation to the rotary shaft.

SUMMARY OF THE INVENTION

In general, the objects and purposes of the invention are met by providing a cup seal installation device which has first and second handle parts each having an axially extending hole therethrough. The second handle part is relatively reciprocally mounted in the opening of the first handle part so that the two handle parts have generally coaxial longitudinal axes. Structure is provided for coupling the two handle parts together and for limiting the amount of reciprocal movement therebetween to first and second limits. A first outside diameter portion on the second part terminates in a first shoulder and a second outside diameter portion larger than the first outside diameter portion. The first shoulder is oriented beyond the end of the first handle part when the first and second handle parts are oriented at a first limit. The first shoulder is oriented inside the first handle part when the first and second handle parts are oriented at a second limit. An elongate guide member having a stem at one end thereof is removably received into the hole provided in the second handle part. The outer surface of the guide member and the outer surface of the first outside diameter portion on the second part are generally equal in diameter so that a smooth and unobstructed transition surface exists between the two surfaces. The end of the guide member remote from the stem has a guide surface thereon converging in a direction away from the stem so that the cup seal can be guided onto the guide surface with the initial converging wall of the lip on the seal being conformed to the converging wall of the guide surface. The seal can thereafter be quickly slid along the length of the guide member to a position abutting the shoulder and snugly encircling the first outside diameter portion to thereby enable the stem of the guide member to be removed from the hole in the second handle part. The resilient compressibility of the inside diameter portion of the lip will effect a snug holding of the seal onto the first outside diameter portion to thereby ready the seal for installation.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 1 is a partially sectioned side view of a prior art seal installation device;

FIG. 2 is a central longitudinal sectional view through the aforementioned prior art device in a first stage of assembly of a seal onto a shaft;

FIG. 3 is a view similar to FIG. 2 but with the seal in its final stage of installation encircling a shaft;

FIG. 4 is a central longitudinal sectional view through a seal installation device embodying the invention;

FIG. 5 is a sectional view taken along the line V—V of FIG. 4;

FIG. 6 is a side view of the seal installation device with a seal positioned thereon following its placement on the device;

DETAILED DESCRIPTION

Figure 8:
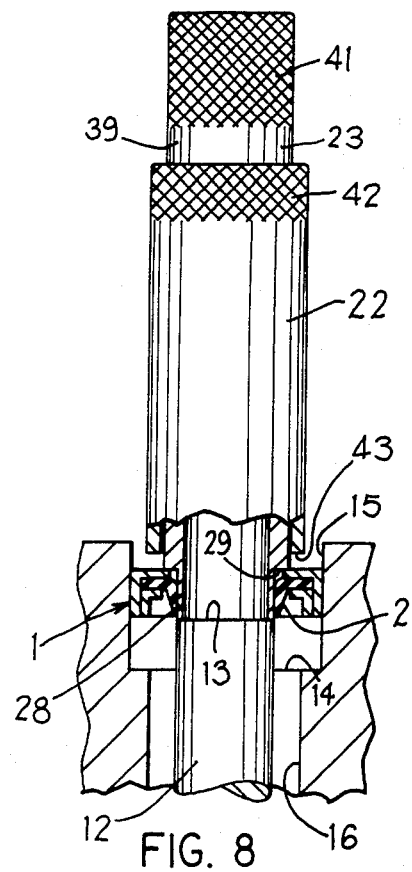
FIG. 8 is a partially sectioned view of the seal installation device with the seal being oriented for placement into encircling relation to the shaft.

Referring to FIG. 4, the seal installation device 21 embodying the invention includes a first generally cylindrical handle part 22 and a second generally cylindrical handle part 23. The first handle part 22 is hollow and reciprocally receives therein the second handle part 23. The second handle part 23 has a pair of diametrically opposed elongate slots 24 therein. A pin 26 is fixedly connected to and extends diametrically through the central opening of the first handle part 22 and through the slots 24 of the second handle part 23. When the pin engages one end of the slots 24, a first limit position will be defined and when the pin engages the opposite end of the slots 24, a second limit position will be defined.

A first portion 27 of the second handle part 23 extends beyond one end of the first handle part 23 when the two handle parts are oriented at a first of the limits. The first portion includes a necked-down part 28 having a first outside diameter smaller than the outside diameter of the second handle part 23 received in the interior of the first handle part 22. A shoulder 29 is defined by the difference in diameters between the necked-down portion 28 and the outside diameter of the second handle part received in the interior of the aforesaid first handle part.

The second handle part 23 has a central hole 31 extending therethrough. A guide member 32 has a stem 33 thereon adapted to be received into the hole 31. The stem 33 is of a diameter generally equal to or slightly less than the inner diameter of the hole 31. The guide member 32 has a shoulder 34 thereon separating the outside diameter of the stem from the outside surface 36 of the guide member 32. The outside diameter of the outside surface 36 is generally equal to the outside diameter of the necked-down portion 28 so that a smooth and unobstructed transition surface exists therebetween. The end of the guide member 32 remote from the stem 33 converges in a direction away from the stem 33. In this particular embodiment, the end 37 is conical and has a blunt end 38 at the smaller end thereof.

A second portion 39 of the second handle part 23 extends beyond the opposite end of the second handle part 22. The outside surface of the second portion 39 is knurled as at 41 as is the mutually adjacent outside surface portion of the first handle part 22, as at 42.

In use, the installation device is first oriented to a position similar to that shown in FIG. 6. The cup seal 1 is oriented so that the conicity of the lip 2 is oriented in the same direction as the conicity of the guide surface 37. The seal 1 can be, unlike the prior art device described above, quickly slid onto the outside surface 37 of the guide member 32 and thence onto the necked-down portion 28. In this particular embodiment, the spacing between the shoulder 29 and the terminal end of the necked-down portion 28 is approximately the same as the thickness of the cup seal 1. That is, the terminal end 10 of the lip 2 coincides with the terminal end of the necked-down portion 28. It is to be noted that the user does not need to be concerned about the lip 2 becoming tucked under or otherwise deformed during this procedure of mounting the seal onto the necked-down portion 28.

Figure 9:
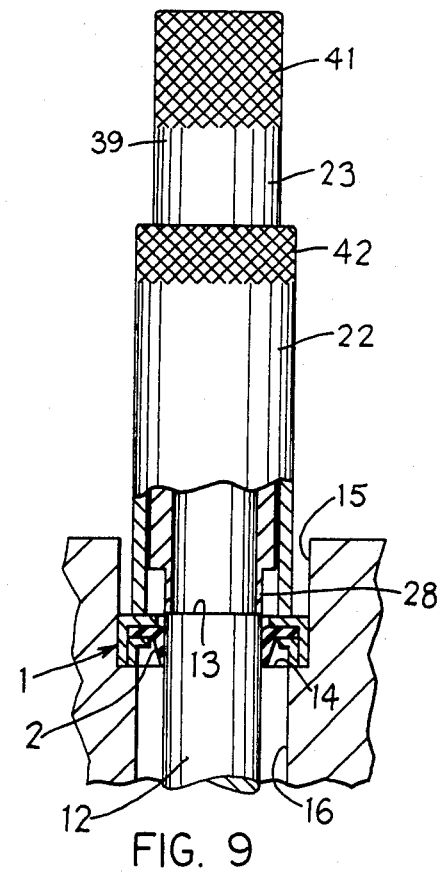
FIG. 9 is a view similar to FIG. 5 but with the seal in the final stage of assembly encircling the shaft.
Figure 7:
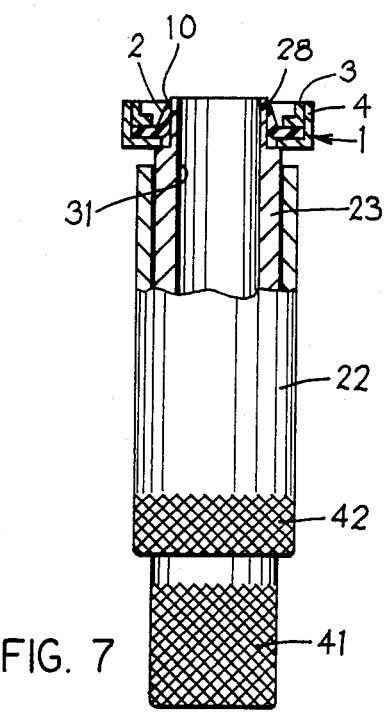
FIG. 7 is a partially sectioned side view of the seal installation device with the guide member removed therefrom.

Thereafter, the guide member 32 is removed as illustrated in FIG. 7. The resilient compressibility of the lip 2 forms a friction grip on the necked-down portion 28 of the second handle part 23 and will generally hold the seal to the second handle part no matter what the position thereof may be. Thereafter, the two handle parts 22 and 23 are oriented to a position such as is illustrated in FIG. 8 to enable a placement of the seal 1 into the counterbore 15. The outside diameter of the seal 1 is such as to create a forced fit inside the counterbore 15. The shaft 12 is received into the central hole 31 in the second handle part. In fact, the terminal end of the necked-down portion 28 will engage the shoulder 13 on the shaft 12. It is preferred that the outer diameter of the shaft 12 between the shoulder 13 and the terminal end thereof be generally equal to or slightly less than the diameter of the hole 31 so that a guiding and sliding fit is generated between the aforesaid segment of the shaft 12 and the second handle part 23. In this manner, the seal 1 is permitted to be forced fit into the counterbore 15 in an accurately aligned relation. Also, and during the procedure of placing the two handle parts 22 and 23 onto the shaft 12, the lip 2 of the seal 1 is protected from engagement with the shaft 12. Also, and during the aforesaid procedure, the second handle part is shifted to the first limit relative to the first handle part 22. Thereafter, and referring to FIG. 9, following an engagement of the end of the necked-down portion 28 with the shoulder 13, the first handle part 22 is shifted axially relative to the second handle part 23 and to cause the pin 26 to move toward the second limit. This procedure will cause the end 43 of the first handle part 22 to engage the metal casing 4 of the seal 1 to urge the seal 1 further into the counterbore from its friction engagement with the necked-down portion 28 to a frictional engagement with the shaft 12. Eventually, the seal 1 will engage the bottom 14 of the counterbore 15. The lip 2 only has to slide a very small distance on the shaft 12 thereby minimizing, due to the accurate alignment between the shaft 12 and the second handle part 23, a proper positioning of the seal 1 onto the shaft 12.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A cup seal installation device, comprising:
   an elongate first handle part having means defining a first axially extending hole therethrough;
   an elongate second handle part relatively reciprocally mounted in said opening in said first handle part, said first and second handle parts having generally coaxial longitudinal axes;
   coupling means for coupling said first and second handle parts together and for limiting the amount of relative reciprocal movement therebetween to first and second limits, said second handle part having first and second portions each extending beyond opposite ends of said first handle part, said first portion having a first outside diameter portion and means defining a second axially extending hole concentric to said first axially extending hole, said first outside diameter portion on said first portion terminating in a first shoulder and a second outside diameter portion larger than said first outside diameter portion, said first shoulder extending beyond the same end of said first handle part as said first portion when said first and second handle parts are oriented at said first limit, said first shoulder being oriented inside said first hole in said first handle part when said first and second handle parts are oriented at said second limit; and
   an elongate guide member having a stem at one end thereof removably received in said second hole, said guide member having a second shoulder thereon and an outside surface of larger diameter than said stem and generally equal in diameter to said first outside diameter portion so that a smooth and unobstructed transition surface means exists between said outside surface and said first outside diameter, the end of said guide member remote from said stem having a guide surface converging in a direction away from said stem, whereby said cup seal having a conical lip portion resiliently compressible to a diameter equal to said first outside diameter portion is first oriented so that the capacity of said lip conforms to the converging direction of said guide surface and is then guided onto said guide surface and slid along the length of said guide member to a position snugly encircling said first outside diameter portion to thereby enable said stem of said guide member to be removed from said second hole, the resilient compressibility of said lip portion effecting a snug holding of said cup seal on said first outside diameter portion of said second handle part and to thereby ready said cup seal for installation.

2. The cup seal installation device according to claim 1, wherein said first and second handle parts are cylindrical in cross section and said first hole is also cylindrical in cross section, the outer diameter of said second handle part being generally slightly less than the inside diameter of said first hole to allow for said reciprocal movement between said first and second handle parts while maintaining said generally coaxial relation therebetween.

3. The cup seal installation device according to claim 1, wherein said coupling means includes an elongate pin extending diametrically across the inside of said first hole, and wherein said second handle part has a pair of diametrically opposed longitudinally extending slots receiving therethrough said elongate pin, the longitudinal ends of said slot defining said first and second limits.

4. The cup seal installation device according to claim 1, wherein said second hole is cylindrical in cross section, wherein said stem is also cylindrical in cross section and is of a diameter slightly less than the diameter of said second hole, and wherein said guide surface is conical.

\* \* \* \* \*